Jan. 28, 1930.                 J. D. LEMEX                  1,745,304
                              FLOAT COUPLING
                           Filed Aug. 25, 1925
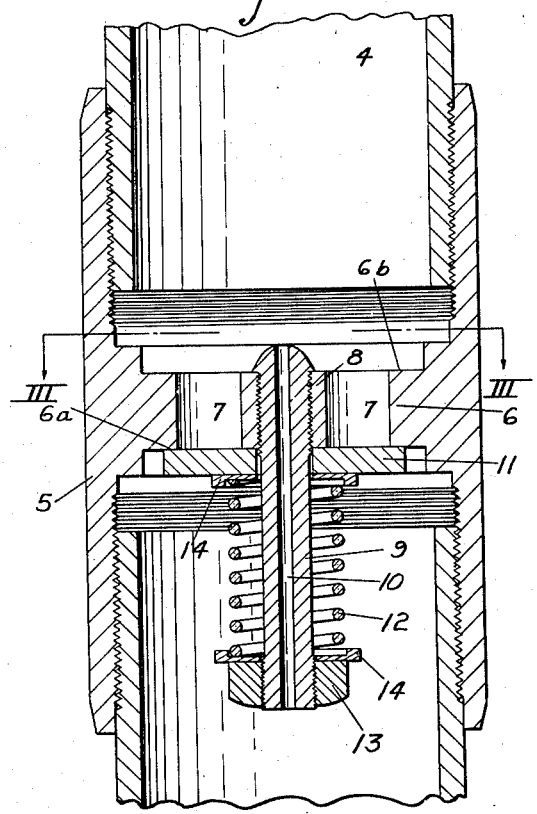
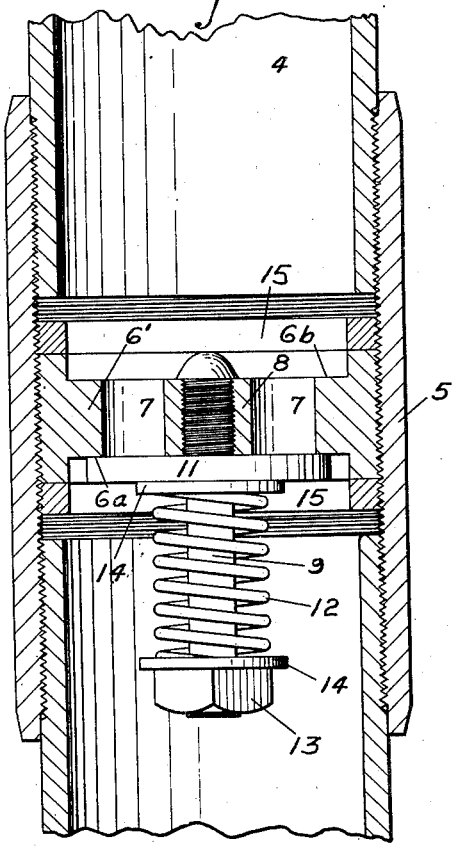
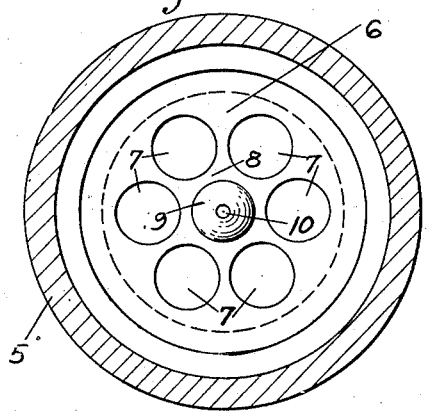
INVENTOR.
John D. Lemex
BY
W. G. Doolittle
ATTORNEY.

Patented Jan. 28, 1930

1,745,304

UNITED STATES PATENT OFFICE

JOHN D. LEMEX, OF TULSA, OKLAHOMA, ASSIGNOR TO OIL WELL SUPPLY COMPANY, OF PITTSBURGH, PENNSYLVANIA, A CORPORATION OF PENNSYLVANIA

FLOAT COUPLING

Application filed August 25, 1925. Serial No. 52,274.

This invention is for an improvement in couplings of the type used in oil well drilling and known in the art as float couplings.

When long strings of drill pipe are lowered into a well, the weight of the pipe is exceedingly great, and it is the present practice to attach, in some point in the pipe string, means which will prevent the fluid from entering through the bottom of the pipe so that the pipe may be floated into the hole.

In all present articles provided for this purpose, a valve is provided which closes a port in the coupling to exclude the fluid in the well as the string of pipe is lowered. In using such a coupling, it is necessary, after a certain amount of pipe has been placed in the hole, to pump water or other fluid into the upper part of the pipe to protect the pipe against the collapsing pressure on the outside of the pipe and to also even up the pressure above and below the valve.

According to the present invention, it is proposed to provide a valve coupling which will permit of the pipe being floated into the hole but wherein there is a by-pass to permit a small quantity of fluid to enter the pipe as the pipe is lowered and eventually permit the pipe to fill, thereby eliminating any necessity for pumping water or other fluid into the pipe.

The invention will be readily understood by reference to the accompanying drawings; in which:

Figure 1 represents a vertical section through a coupling embodying my invention.

Figure 2 is a similar view of a slightly modified form, and,

Figure 3 is a transverse section in the plane of line III—III of Figure 1.

In Figure 1, 5 represents the body of a coupling member having upper and lower interiorly threaded ends to permit of the member being coupled between sections of pipe. Between the upper and lower threaded portions is a transverse partition 6 having ports 7 therein arranged about a central portion 8. The central portion 8 has an opening therethrough and is interiorally threaded to receive the upper end of a valve stem 9. The valve stem 9 has vertical passage 10 extending entirely therethrough. The drill pipe is indicated at 4.

Slidable on the stem 9 is a disk valve 11 which is normally urged closed by a spring 12 surrounding the valve stem and held in confinement by a nut 13 on the lower end of the stem. Spring plates 14 may be provided at each end of the spring. If desired the upper end of the stem 9 may be peened over to provide a head for the upper end of the stem.

The valve 11 seats against a seat $6^a$ on the web 6. If desirable, the web 6 may have two seats thereon, one at $6^a$ and one at $6^b$. The purpose of this is to permit the valve elements to be reversed and the coupling to be reversed from the position shown, where this would be desirable or necessary.

In operation, the coupling is secured to a string of pipe in the usual manner. The spring 12 normally holds the valve 11 seated to cover the ports 7 and the pressure of the fluid in the well also tends to urge this valve closed, similarly to any check valve. As the string of pipe is lowered into the well, fluid may pass by the valve through the passage 10 in the stem 9.

The fluid enters the drill pipe through the passage 10 so slowly that it does not prevent the pipe from being floated into the well. At the same time it permits the pressures in the pipe to eventually equalize, to protect the pipe against collapse. The valve of course will open when a mixture of mud and water commonly used in drilling, is forced down through the pipe.

In the construction shown in Fig. 2 the coupling is of the same general construction but instead of the web 6 being integral with the coupling, the coupling is threaded throughout its entire length. The partition or web, designated 6', is screwed into the coupling and retained in position by threaded rings 15. In other respects the coupling of Fig. 2 is similar to Fig. 1 and corresponding reference numerals have been used to designate corresponding parts.

While I have illustrated two special forms of the invention, it will be understood that various changes and modifications may be made therein within the scope and spirit of my invention.

I claim as my invention:

A float coupling having a coupling body, a ported transverse partition therein disposed substantially midway of the ends of the body to intercept the fluid passage of drill pipe sections, said coupling on each side of the partition having screw-threaded attaching portions, a stem carried by said partition and attachable from either side thereof, said partition being recessed from opposite sides to provide seats in line with the bore of attached pipe sections, a valve slidable on said stem to engage said seats according to the position of the stem, a spring on the stem normally maintaining the valve seated and urging it toward seated position, and said stem having a fluid passage therethrough of relatively small cross sectional area to provide a by-pass around the partition when the valve is closed.

In testimony whereof I affix my signature.

JOHN D. LEMEX.